United States Patent [19]

Nimmo

[11] Patent Number: 5,173,685
[45] Date of Patent: Dec. 22, 1992

[54] MONITORING CIRCUITS FOR LAMPS OR OTHER ELECTRICAL LOADS USING A COMPARATOR WITH A CONSTANT VOLTAGE POWER SUPPLY

[75] Inventor: George R. Nimmo, Twickenham, United Kingdom

[73] Assignee: Gordon Alan King, London, United Kingdom

[21] Appl. No.: 678,302

[22] PCT Filed: Oct. 13, 1989

[86] PCT No.: PCT/GB89/01214
§ 371 Date: Jun. 7, 1991
§ 102(e) Date: Jun. 7, 1991

[87] PCT Pub. No.: WO90/03900
PCT Pub. Date: Apr. 19, 1990

[30] Foreign Application Priority Data
Oct. 14, 1988 [GB] United Kingdom ............... 8824095

[51] Int. Cl.[5] ........................................... G08B 21/00
[52] U.S. Cl. ........................... 340/642; 340/458;
340/641; 307/10.8; 315/129
[58] Field of Search ............... 340/641, 642, 458;
307/10.8; 315/120, 129, 130; 324/403, 414

[56] References Cited

U.S. PATENT DOCUMENTS
3,706,983 12/1972 Olson et al. ..................... 340/642 X FOREIGN PATENT DOCUMENTS
0011454 5/1980 European Pat. Off. .
0044187 1/1982 European Pat. Off. .
0124963 11/1987 European Pat. Off. .
2832556 2/1980 Fed. Rep. of Germany .
2367401 7/1978 France .
1342248 1/1974 United Kingdom .
2091504 7/1982 United Kingdom .

Primary Examiner—Jin F. Ng
Assistant Examiner—Jeffery A. Hofsass
Attorney, Agent, or Firm—Kerkam, Stowell, Kondracki & Clarke

[57] ABSTRACT

A circuit for monitoring electrical loads, e.g. lamps especially in motor vehicles, comprises a power supply line (14) for supplying electric current for illuminating a lamp (10, 12), and means (58) for providing a reduced electric current through the lamp when not illuminated. A resistor (24) is in series with the lamp, and a comparator (40) is arranged to compare the potential of a point between the resistor and the lamp with a reference potential when the lamp is not illuminated for generating a warning signal in the event of lamp failure. A further power supply line (48) is also provided, and means (50) for establishing a fixed potential difference between the further and the first power supply lines. The comparator is arranged such that the fixed potential difference provides a constant voltage power supply for the comparator.

14 Claims, 2 Drawing Sheets

MONITORING CIRCUITS FOR LAMPS OR OTHER ELECTRICAL LOADS USING A COMPARATOR WITH A CONSTANT VOLTAGE POWER SUPPLY

TECHNICAL FIELD

This invention relates to electrical monitoring circuits for detecting the failure of electrical loads, and is especially applicable to monitoring the serviceability of lamps, e.g. incandescent filament lamps or light emitting diodes, and can be used for monitoring the lamps of motor vechicle lighting systems.

BACKGROUND ART

Electrical monitoring circuits are known which provide a warning signal, usually in the form of a warning light, indicating the failure of or a fault in a lamp. One such system, described in U.K. Patent No. 1,342,248, monitors the lighting circuits of a motor vehicle in order to detect any lamp failures which may occur. In that system the potential difference across a low value resistor inserted in series with each lamp is monitored and when the potential difference is zero a fault is indicated.

Another such system, also employing a low value series resistor as a detector and designed to overcome undesirable temperature-dependence characteristics of earlier systems, is described in U.K. Patent No. 2,034,948 B. Moreover, this system provides additional monitoring facilities to discriminate between lamp failure and faults due to the low value series resistor being open-circuit or a fuse failure. This latter patent also describes in detail various integrated circuit embodiments of such systems which can monitor groups of lamps including lamps which are required to operate only intermittently such as the vechicle's brake lights.

The known systems provide an indication of the failure of a vehicle's lamps during their use only and may be described as energised or 'hot' monitoring systems; they are not capable of monitoring a lamp that is not energised, i.e. they do not have a de-energised or 'cold' monitoring capability.

It is an object of the present invention to provide a means whereby the detection of a failure of the filament of a vehicle's lamp may be made whilst that lamp is de-energised or 'cold'.

It has been suggested that 'cold' monitoring could be achieved by providing a bleed resistor across the on/off switch for the lamps, such a resistor providing a small leak current through the lamp(s) and associated in-series resistors when the switch is open; the voltage across the in-series resistor could then be monitored in the same way as 'hot' monitoring. However, the leak current must be very low so as to avoid undue draining of the battery and thus the voltage drop across the in-series resistor would be minute (e.g. 10 microvolts, which contrasts with a typical voltage drop during hot monitoring of approximately 20 millivolts).

A technique known as 'auto-zeroing' has been known for several year to reduce amplifier (and comparator) errors to very low (unmeasurable) levels. This technique uses two operational amplifiers which alternate in serving the input signals; while one amplifier is performing the comparison (or amplification) function, the other is nulling itself and storing a correction term on a capacitor. The input is then transferred to the recently nulled amplifier and the previous amplifier corrects its errors. This cycle is repeated under a suitable controlling switching circuit. No-one has suggested applying such a technique to cold monitoring of vehicle bulbs but it is not a technique which is readily applicable to use in vehicles since auto-zeroing is highly sensitive to voltage transients and so would be unreliable in a vehicle where the voltage supplied by the battery can vary considerably depending on the load on the battery.

A further problem arises if the same comparator is to be used to perform both 'cold' monitoring and 'hot' monitoring since the input to the comparator in the former case would be a potential close to earth while the input in the latter case would be the voltage rating of the battery (usually 12 volts) and this would lead to great unreliability in operation of such a sensitive comparator.

DISCLOSURE OF THE INVENTION

Circuits have now been developed for monitoring the serviceability of electrical loads (and especially lamps) that are capable of passing a relatively small current when the load is not operational but that do operate when a relatively larger current is passed through them. The circuit finds special application in monitoring loads powered by supplies, e.g. batteries, whose potential can fluctuate.

According to the present invention, there is provided a circuit for monitoring the serviceability of at least one electrical load, e.g. a lamp, when it is not energised, which circuit comprises a first power supply rail for supplying electric current to the load, a resistor in series with the load, means for providing a bleed current through the load and the resistor when the load is unenergised (which current is usually less than 100 mA, e.g. less than 50 mA, and preferably about 5 to 20 mA for a 12 volt power supply), a comparator capable of comparing the potential of a point between the resistor and the load when the load is not energised with a reference potential, a further power supply rail, and means for establishing a fixed potential difference between the first power supply rail and the further power supply rail and wherein the said comparator has as a power supply the fixed potential difference between the first power supply rail and the further power supply rail.

The comparator is preferably such that it can detect potential differences of less than 50 microvolts between its inputs, and preferably less than 20 microvolts. It is preferably an auto-zeroing comparator.

Using such an arrangement, the comparator is driven from a constant potential power supply irrespective of the voltage supplied to the load and so gives a consistent and reliable output; this is particularly important in the case of a vehicle battery the potential supplied by which can vary depending on the amount of current drawn by other vehicle equipment.

In a preferred form of the invention, the comparator has a floating power supply in that the first power supply rail is connected to the power supply, e.g. the vehicle battery, by a switch, and the arrangement is such that, when the first power supply rail is disconnected from the power supply by the switch, the comparator compares potentials close to earth potential and one terminal of its own power supply is close to earth potential, whereas when the loads are energised (i.e. operational) and the first power supply rail assumes a higher potential (usually 12 volts), the comparator compares signals close to 12 volts which, again, is a potential close to the potential of one terminal of the comparator power supply. Thus the same comparator can be used for both 'hot' and 'cold' monitoring.

According to a second aspect of the present invention there is provided a circuit for monitoring the serviceability of at least one load when it is not energised (cold monitoring) and when it is energised (hot monitoring), which circuit comprises a first power supply rail, a switch for connecting the first power supply rail to a source of potential to energise the load, a resistor in series with the load, means for providing a bleed current to the load and the resistor when the switch is open, a second power supply rail, means for establishing a fixed potential difference between the first power supply rail and the second power supply rail, a comparator for comparing first and second signals supplied to first and second inputs thereof and providing an output signal indicative of failure of the load when the signals supplied to the first and second inputs have a predetermined relationship to each other, wherein the power supply of the comparator is derived from the fixed potential difference between the first and the second supply rails, and wherein the first comparator input signal is a signal indicative of the potential of a point between the resistor and the load and the second comparator input signal is a reference signal indicative of a first reference potential during cold monitoring and a second reference potential during hot monitoring.

BRIEF DESCRIPTION OF THE DRAWINGS

The present invention will be described in further detail, by way of example only, with reference to the accompanying circuit diagrams in which.

BEST MODE FOR CARRYING OUT THE INVENTION

Figure 1:
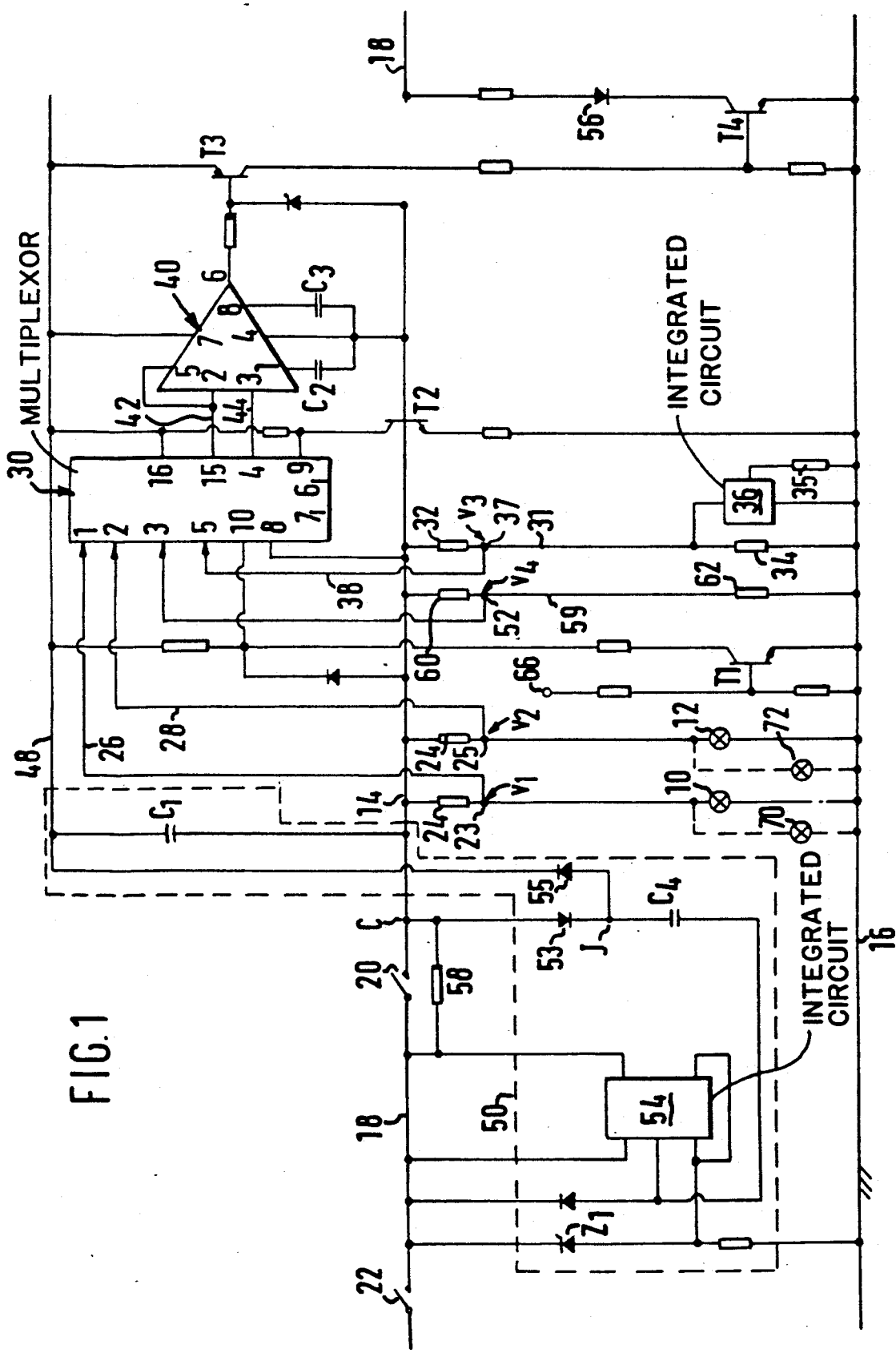
FIG. 1 shows a circuit according to the present invention which is capable of monitoring the serviceability of lamps both when they are illuminated (hot monitoring) and when they are not (cold monitoring)

The 'hot' and 'cold' monitoring circuit of FIG. 1 includes a first and a second bulb 10 and 12, e.g. the left and right brake lights of a vehicle, which are connected between a power supply rail 14 and an earth line 16. The power rail 14 can be energised to switch on the bulbs by connecting it to the main power line 18 of the vehicle by means of a switch 20; the main power line is connected to the vehicle battery (not shown) by the ignition switch 22. Thus, when the ignition is switched on and switch 20 is closed, current is supplied to rail 14 and so energises (or lights) lamps 10 and 12.

The lamps 10 and 12 are each connected in series with a low value resistor 24, typically having a rating of 1.25 milliohms. The potentials $v_1$ and $v_2$ at points 23 and 25 between resistors 24 and their respective lamps 10 and 12 are fed by leads 26, 28 to channels 1 and 2 of a multiplexer 30 (RCA 4053).

Hot Monitoring

Connected between power supply line 14 and the earth line are a first resistor 32 (about 0.024 ohms), two further resistors 34 and 35 (24K and 120 ohms respectively) and a known integrated circuit 36 forming one arm (the 'hot' monitoring arm 31) of a wheatstone bridge, the other arm of which is formed by one of the lines containing bulbs 10 and 12 as will become evident later; the potential $v_3$ at a point 37 between the two resistors 32 and 34 is fed by lead 38 to pin 5 of the multiplexer 30. The integrated circuit 36, together with the resistors 34 and 35, emulates the potential drop across bulbs 10, 12 when energised. It would not be possible to emulate the potential drop across lamps with a single resistor because the resistance of the lamp filament varies markedly with the applied voltage due to the change in resistance of the filament with a change in its operating temperature which is brought about by a change in the potential across the filament. Integrated circuit 36 and resistor 35 form a constant current source of known design and the sum of the fixed current through circuit 36 and the variable current through resistor 34 emulates the behavior of lamps 10, 12 with changing voltage. The values of the resistors 24 and 32 and the resistance of the components 34 to 36 are chosen to balance the wheatstone bridge when the bulbs 10 and 12 are intact. The resistance provided by the 'hot' reference arm should be relatively high (compared to the combined resistance of bulb 10 or 12 and one of the resistors 24) to minimise the current flowing through the 'hot' reference arm.

An auto-zeroing comparator 40 (ICL 7652/LTC 1052 CN8) is provided for comparing the potential $v_3$ with potentials $v_1$ and $v_2$, the potentials $v_1$ and $v_2$ being alternately supplied to the comparator for comparison with potential $v_3$ by the multiplexer 30 as will be described in greater detail below. Auto-zeroing comparators are known integrated circuits and contain two operational amplifiers which alternate in comparing the potential on two input lines 42 and 44 connected to output pins 15 and 4 of the multiplexer 30. While one amplifier is performing the comparison function the other is nulling itself and storing its correction term on one of two capacitors, $C_2$, $C_3$ (0.1 microfarad each). When this has been performed, the inputs are transferred to the second amplifier while the first amplifier corrects itself and stores its correction term on the other of the capacitors $C_2$, $C_3$. Such a comparator can distinguish extremely small voltage differences between its inputs, e.g. 10 microvolts, and such a comparator could not normally be used in a vehicle system because it would be sensitive to changes in the supply voltage at its power input, e.g. caused by changing temperature or by a changing load on the battery, but it can be used in the arrangement of the present invention because power is supplied to the comparator 40 through a further power supply rail 48, which is maintained at a fixed potential relative to the supply rail 14 by means of a circuit 50 which is a charge pump of known design (see LTC 1044.7660 Switched Battery Voltage Converter Texas Instruments (May 1987)). The charge pump 50 maintains the potential of rail 48 at a fixed value, e.g. at +5 V, relative to the potential at point C on rail 14. Since the power for the charge pump 50 is derived from line 18 between the ignition switch 22 and the lamp switch 20, it operates only when the ignition is switched on. Then, when switch 20 is open and point C is at approximately ground potential, the charge pump maintains rail 48 at +5 V. However, when switch 20 is closed to energise the lamps, the potential of point C increases to +12 volts and so the potential of rail 48 is increased to +17 volts.

Figure 2:
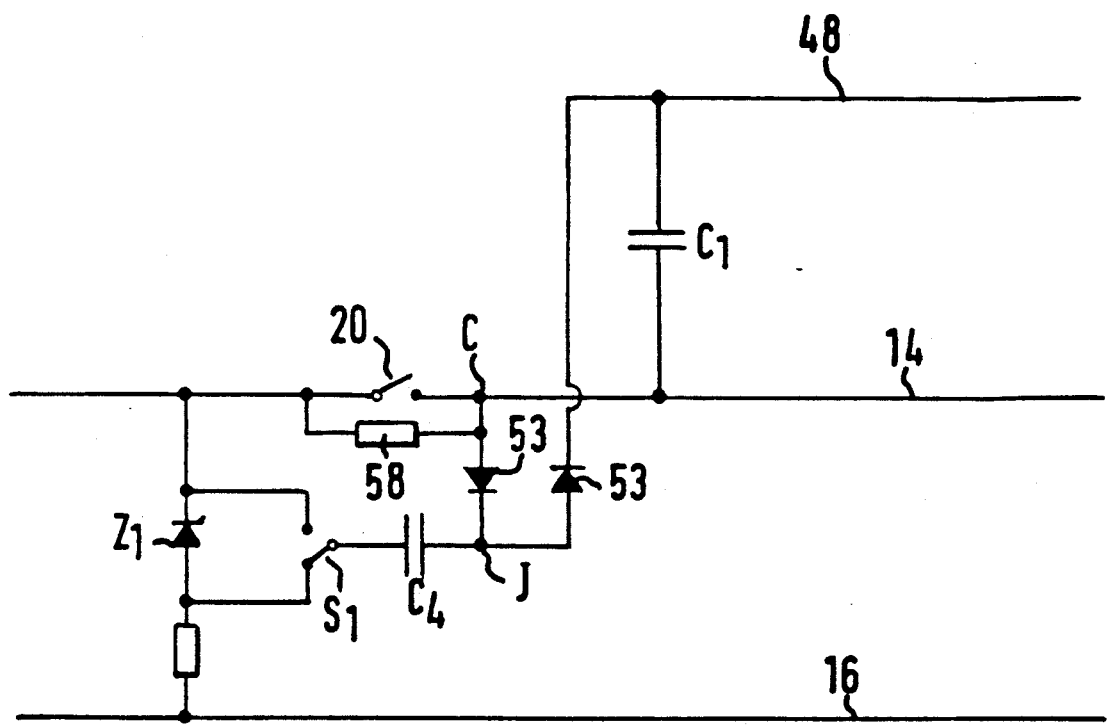
FIG. 2 illustrates the operation of part of the circuit of FIG. 1 known as the charge pump.

The operation of the charge pump is as follows (with reference to FIGS. 1 and 2): a voltage of 5.6 V set by zener diode $Z_1$ is switched to charge capacitor $C_4$ by oscillating switch $S_1$ which is integrated in the circuit 54 shown in FIG. 1 and which is switched rapidly between its two positions by an oscillator also within integrated circuit 54. The capacitor $C_4$ is thus charged to a potential of 5.6 volts and this potential is applied as an input to a summing junction J. Depending whether the lamp switch 20 is closed or open, a potential of either 12 volts or 0 volts (respectively) will also be applied as a further input to the summing junction J from point C by way of a diode 53. The output from the summing junction J is applied by way of a diode 55 to the capacitor $C_1$. If the current drawn by the overall load between the first and second power supply rails 14 and 48 is small compared to the current supplied to the second supply rail 48 and to the capacitor $C_1$ (as is the case with the current drawn by the comparator 40), then the capacitor $C_1$ will accumulate the voltage across the zenner diode $Z_1$. In fact, due to the voltage drop across diode 55 of approximately 600 mV, the voltage across capacitor $C_1$ is approximately 5 V. i.e. the second rail 48 is maintained at a potential of +5 V as compared to first rail 14. Since the power terminals of comparator 40 are connected to rails 14 and 48, the comparator is always supplied with a fixed voltage set by the charge pump 50, e.g. 5 V, irrespective of the potential of line 14.

Returning to FIG. 1, if the bulbs 10, 12, are intact, the potentials $v_1$ and $v_2$ are equal to the potential $v_3$ and the comparator will provide a zero output. If, however, the lamp 10 fails, the potential at $v_1$ increases to the potential of line 14 and this imbalance will cause comparator 40 to provide an output which makes transistor T3 conducting which in turn makes transistor T4 conducting and so energises LED 56 giving a warning of this lamp failure. The power for energising LED 56 is derived from the ignition circuit 18 of the vehicle.

Cold Monitoring

Cold monitoring is achieved by allowing a small bleed current to flow through resistor 58 (rating 1 kohm divided by the number of bulbs being monitored by the channel, i.e. with two bulbs as show, resistor 58 would have a resistance of 500 ohms). In the circuit given, this produces a current of about 12 mA through each resistor 24 and through the bulbs 10 and 12 causing a voltage drop of about 15 microvolts across the resistors when the bulbs are intact. The voltages $v_1$ and $v_2$ are fed to inputs 1 and 2 of multiplexer 30 and are alternately supplied to comparator input 42 and so compared against a reference potential $v_4$ derived from a point 52 between resistors 60 and 62 (10 ohms and 24 kohms respectively) in a 'cold' monitoring arm 59. Resistors 60 and 62 are of such values that potential $v_4$ equals potentials $v_1$ and $v_2$ when the bulbs 10 and 12 are intact. Compared to the combined resistance of resistor 24 and bulb 10 or resistor 24 and bulb 12, the resistance of 'cold' monitoring reference arm 59 (containing resistors 60 and 62) is high so that the amount of current drawn down arm 59 is very low.

In cold monitoring, there is no need to include an integrated circuit 36 since the resistance of bulbs 10 and 12 are practically constant.

The bleed of 24 mA (in the case of two bulbs per channel) from the battery will not produce a significant drain on the vehicle battery especially since the monitoring system is switched off by the ignition switch 22. The value of the resistor 58 should be chosen so that the voltage drop across resistors 24 is high enough to be measurable by the comparator without drawing excessive current from the battery.

Operation

During 'cold' monitoring, the potential $v_4$ is supplied by multiplexer 30 to the input line 44 of the comparator while during 'hot' monitoring, it is the potential $v_3$ that is supplied by multiplexer 30 to the input line 44. The multiplexer 30 also supplies the voltages $v_1$ and $v_2$ alternately to the other input line 42 of comparator. Thus during 'cold' monitoring, a wheatstone bridge is formed with one arm thereof being the 'cold' monitoring arm 59 and the other arm being alternately formed by the line containing lamp 10 and the line containing the lamp 12. During 'hot' monitoring the first arm of the bridge is instead formed by 'hot' reference arm 31.

Switching of the multiplexer 30 is conducted as follows: when switch 20 is open and ignition switch 22 is closed, the voltage on line 14 is about 29 mV above earth potential of ground rail 16. This causes transistor T2 to be non-conductive so that the voltage applied to inputs 9 and 16 of the multiplexer are equal (about 5 volts); under these circumstances, the multiplexer connects its input pin 3 (providing potential $v_4$) to its output pin 4 and so the voltage $v_4$ of cold monitoring bridge arm 59 is fed to the comparator input 44. When switch 20 is closed, causing bulbs 10 and 12 to become energised and requiring hot monitoring, the voltage on rail 14 rises to 12 volts causing transistor T2 to become conducting; this results in different voltages being applied to pins 9 and 16 of multiplexer 30, causing multiplexer to connect its input pin 5 (supplying the voltage $v_3$ of hot monitoring bridge arm 31) to output pin 4 of the multiplexer and hence to input line 44 of the comparator 40.

The multiplexer 30 is also switched to alternately connect potential $v_1$ and potential $v_2$ to output pin 15 of multiplexer 30 and hence to input line 42 of comparator 40; this is achieved by applying a zero potential and a positive potential alternately at point 66. When the potential is zero, transistor T1 is non-conductive and the potential applied to pin 10 of the multiplexer is the potential of rail 48 (5 or 17 volts) causing the signal applied to pin 1 of the multiplexer (i.e. voltage $v_1$) to be applied to input lead 42 of the comparator 40. When a potential is applied at point 66, the transistor T1 is rendered conductive causing the potential of pin 10 of the multiplexer to drop to the potential of rail 14, thereby causing the multiplexer to connect its input pin 2, i.e. potential $v_2$, to comparator input line 42.

It is possible to include more than one bulb in each arm (as shown by ghost lamps 70 and 72). In this case, the value of the bleed resistor 58 and of the resistors 24 should be such that the voltage drop across resistor 24 when both of the parallel bulbs 10, 70 or 12, 72, are intact is approximately the same as the voltage drop across the cold reference resistor 60 and hot reference resistor 32 but when one or both of the parallel bulbs has failed the voltage drop across resistor 24 drops (i.e. the potential $v_1$ or $v_2$ rises) causing an imbalance at comparator 40 and the triggering of the LED 56 as discussed above.

As will be appreciated the number of lines containing lamps can be greater than two, in which case the control for switching the multiplexer 30 will connect each line in turn to the comparator 40.

INDUSTRIAL APPLICABILITY

Although the invention has been described in connection with the monitoring of incandescent lamps, the present invention can be applied in the monitoring of any electrical load that is capable of passing a bleed current when it is not operational and is particularly applicable in monitoring loads powered by a fluctuating potential power source. The circuit can be used in fields other than vehicles, e.g. in aircraft (for monitoring both the external lamps and also the instrument control lamps), in ships and boats, in telecommunications, in industrial and automation control, and in medical and environmental control.

The circuit shown in FIG. 1 can be incorporated into a simple integrated circuit.

I claim:

1. A circuit for monitoring the serviceability of electrical loads comprising a power supply line (14) for supplying electric current to the load (10, 12) to energise it, means (58) for providing a reduced electric current through the load when not energised, a resistor (24) in series with the load, and a comparator (40) arranged to compare the potential of a point between the resistor and the load with a reference potential when the load is so connected that it is not energised for generating a warning signal in the event of load failure, and characterised by a further power supply line (48), and means (50) for establishing a fixed potential difference between the further and the first power supply lines, the comparator being arranged such that the fixed potential difference between the further and the first supply lines provides a constant voltage power supply for the comparator.

2. A monitoring circuit according to claim 1, characterised in that the reduced current is a bleed current, which is less than 100 mA.

3. A monitoring circuit according to claim 2, characterised in that the bleed current is approximately from 5 mA to 20 mA.

4. A monitoring circuit according to claim 1, characterised in that the comparator is capable of detecting potential differences of less than 50 microvolts between the potential of the point between the resistor and the load and the reference potential.

5. A monitoring circuit according to claim 1, characterised in that the comparator is capable of detecting potential differences of less than 20 microvolts between the potential of the point between the resistor and the load and the reference potential.

6. A monitoring circuit according to claim 4, characterised in that the comparator is an auto-zeroing comparator.

7. A monitoring circuit according to claim 1, characterised in that the first power supply line has a potential level determined according to an output from a parallel connection of a switch (20) and the reduced current providing means, and in that the fixed potential establishing means comprise a charge pump arranged to control the potential level of the further power supply line in dependence upon the potential level of the first power supply line.

8. A monitoring circuit according to claim 1, characterised in that the comparator is arranged to compare the potential of the point between the resistor and the load with a second reference potential when the load is connected to be energised for generating a warning signal in the event of load failure.

9. A monitoring circuit according to claim 1, characterised by including a plurality of the loads, a respective resistor in series with each load, and means (30) for successively connecting the points between each resistor and the associated load to the comparator.

10. A load monitoring circuit comprising a power supply line (14) for supplying electric current to a load (10, 12), a resistor (24) in series with the load, and a comparator (40) arranged to compare the potential of a point between the resistor and the load with a first reference potential when the load is so connected that it is not operational and with a second reference potential when the load is connected to be operational for generating a warning signal in the event of load failure, characterised in that the comparator is connected between a further power supply line (48) and the first power supply line, and in that means (50) are provided for establishing a fixed potential difference between the further and the first power supply lines.

11. A monitoring circuit according to claim 1, characterised by the load being a lamp.

12. A load monitoring circuit comprising a load, a switch for switching said load on and off, means for supplying a first electric current to said load when said switch is on and a reduced electric current to said load when said switch is off, said means for supplying including a first power supply line, a resistor connected in series with said load and defining with said load a potential monitoring point, means for providing a reference potential having approximately the same magnitude as the potential produced at said potential monitoring point when said reduced electric current is supplied to said load and said load is functioning normally, a comparator arranged to compare the potential produced at said potential monitoring point with said reference potential when said reduced electric current is supplied to said load and to generate a signal in the event that said load is not functioning normally, a further power supply line, and means for establishing a fixed potential difference between said further and said first power supply lines, said comparator being coupled between said further and said first power supply lines whereby said fixed potential difference provides a constant voltage power supply for the comparator.

13. A load monitoring circuit comprising a load, a power supply line for supplying current to said load, a switch for switching said load on and off, a resistor connected in series with said load and defining with said load a potential monitoring point, a source of first and second reference potentials, a further power supply line, means for establishing a fixed potential difference between said further and said first power supply lines, and a comparator connected between said further and said first power supply lines whereby said fixed potential difference provides a constant voltage power supply for said comparator, said comparator being arranged to compare the potential produced at said potential monitoring point with said first reference potential when said switch is off and with said second reference potential when said switch is on for providing a signal in the event of failure of said load.

14. A load monitoring circuit comprising a load, a power supply, a first power supply line, a switch for connecting said first power supply line to said power supply for energising said load, a resistor connected in series with said load and having a potential monitoring point between said resistor and said load, means for providing a bleed current to said resistor and said load when said switch is open, a second power supply line, means for establishing a fixed potential difference between said first and said second power supply lines, a comparator having first and second inputs for receiving, respectively, a first signal representing the potential at said potential monitoring point and a second signal representing a first reference potential when said switch is open and a second reference potential when said switch is closed, said comparator being connected between said first and said second power supply lines for comparing said first and said second signals and providing an output signal indicative of load failure when said first and said second signals have a predetermined relationship with each other.

* * * * *